United States Patent
Dadson et al.

(10) Patent No.: US 7,512,161 B2
(45) Date of Patent: Mar. 31, 2009

(54) DEVICE, METHOD AND SYSTEM FOR GENERATING AN INFRARED IMAGE

(75) Inventors: Carl F. Dadson, Laguna Niguel, CA (US); Mark A. Lundgren, Corona, CA (US); Timothy G. Montgomery, Coto de Caza, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/670,448

(22) Filed: Sep. 25, 2003

(65) Prior Publication Data

US 2005/0058164 A1    Mar. 17, 2005

Related U.S. Application Data

(60) Provisional application No. 60/502,348, filed on Sep. 11, 2003.

(51) Int. Cl.
*H01S 3/10* (2006.01)

(52) U.S. Cl. .................... 372/24; 372/9; 250/316.1; 250/318; 438/164

(58) Field of Classification Search ............. 250/334, 250/330, 332, 341.6, 339.09, 331, 493.1, 250/491.1; 348/164; 372/26, 24; 205/334, 205/332

See application file for complete search history.

(56) References Cited

U.S. PATENT DOCUMENTS

| | | | | |
|---|---|---|---|---|
| 3,680,001 A | * | 7/1972 | Paoli et al. ............... 372/26 |
| 4,375,067 A | * | 2/1983 | Kitamura ............... 347/133 |
| 4,778,985 A | * | 10/1988 | Modisette et al. ..... 250/214 LA |
| 5,085,525 A | * | 2/1992 | Bartosiak et al. ......... 374/124 |
| 5,144,149 A | * | 9/1992 | Frosch ............... 250/493.1 |
| 5,347,128 A | * | 9/1994 | Puram et al. ............. 250/330 |
| 5,512,748 A | * | 4/1996 | Hanson ............... 250/332 |
| 5,525,801 A | * | 6/1996 | Jacksen et al. ........... 250/352 |
| 5,838,014 A | * | 11/1998 | Cabib et al. ........... 250/504 R |
| 6,556,602 B2 | | 4/2003 | Rice et al. |
| 6,749,364 B1 | * | 6/2004 | Baker et al. ............. 404/84.5 |

* cited by examiner

*Primary Examiner*—Minsun Harvey
*Assistant Examiner*—Delma R Forde
(74) *Attorney, Agent, or Firm*—Alston & Bird LLP

(57) ABSTRACT

The infrared image generation device, method and system generate realistic infrared images to accurately test infrared sensors. The device and system include a laser light source, at least one scanner, a processor and a target plate. The scanner(s) receive and redirect the laser light. The processor controls operation of the scanner(s) to generate at least one infrared image and the target plate receives the redirected light from the scanner(s) and, as such, the infrared image(s) are generated on the target plate. For instance, the target plate may display an infrared image having at least one portion that represents a temperature of at least 1000 Kelvin. The target plate may be made of a transparent heat sink layer facing the scanner(s), an insulator layer adjacent to the transparent heat sink layer, and an emissive layer that is at least opaque and is adjacent to the insulator layer.

17 Claims, 2 Drawing Sheets

DEVICE, METHOD AND SYSTEM FOR GENERATING AN INFRARED IMAGE

CROSS-REFERENCE TO RELATED APPLICATIONS

This application claims priority from U.S. Provisional Patent Application No. 60/502,348, filed Sep. 11, 2003, entitled DEVICE, METHOD AND SYSTEM FOR GENERATING AN INFRARED IMAGE the contents of which are incorporated by reference herein in their entirety.

FIELD OF THE INVENTION

The present invention relates to infrared image generation and, in particular, utilizing a laser light source to generate an infrared image on a target plate.

BACKGROUND OF THE INVENTION

Infrared sensors are advantageous in many applications. Some infrared sensors are capable of detecting the heat emitted from an object, such that an object may be viewed by a human via the infrared sensor even if there is little or no visible light incident upon the object. For example, infrared sensors are utilized in night-vision technologies, such as in night-vision goggles to view people and objects at night, in satellite sensors to capture images of portions of the earth at night, and in aircraft sensors to view other aircraft or other objects at night, to name a few. In addition, infrared sensors are not as affected by smoke, dust and other airborne particles as other types of sensors, such that infrared sensors are advantageous in situations in which it would otherwise be difficult to detect an object due to smoke, dust and/or other airborne particles, such as during a fire.

A specific example in which infrared sensors are utilized is in missile defense systems. For instance, a missile defense system utilizes an infrared sensor to detect heat associated with a missile in order to intercept the missile, such as by destroying the missile, before the missile hits its intended target.

The infrared sensors described above must be tested prior to utilizing the sensors to ensure that the sensors correctly detect the desired objects. In the example of a missile defense system, an infrared sensor is typically tested by projecting images of typical objects on a display and positioning the sensor to view the display. The sensor is then monitored to determine whether it accurately detects the image of the object. Thus, the projected images must be as realistic as possible to ensure that the sensor is being tested in a realistic environment. In the case of an infrared sensor for a missile defense system, therefore, the projected images of missiles must accurately depict the shape and temperature of an actual missile.

Conventional infrared image projectors or simulators are typically integrated circuits made of semi-conductor materials in which current is transmitted through resistors to produce heat and create an infrared image, i.e., heater-bump scene projectors. The heat emitted by the resistors, however, is not enough to simulate many extremely high-temperature objects, such as the plume of missiles, fires or the like. Thus, the conventional infrared image projectors can only simulate a limited portion of the infrared spectrum, that is that portion associated with objects having lower temperatures. Furthermore, in addition to being very expensive and time-consuming to build initially, it is also very expensive and time-consuming to make any adjustments to a conventional infrared image projector after it is initially built, such as adjustments to generate a larger image, because each integrated circuit is custom-built for a particular application and any such adjustment requires a new custom-built integrated circuit.

Another type of conventional infrared image projector utilizes an electron-beam to generate target images. The electron-beam therefore "draws" an image on a screen and a sensor views the image from the same side of the screen as the electron-beam source is located. There are, however, many disadvantages associated with the electron-beam infrared image projector. One disadvantage is that the electron-beam must propagate through a vacuum to the screen such that the image projector must provide a vacuum environment for the electron-beam, which adds to the cost and complicates the design of the image projector. In addition, because the sensor and the electron-beam source must be located on the same side of the screen, the design of the image projector and placement of the sensor is awkward and further complicated. Moreover, the screen upon which the electron-beam draws the image must be electrically conductive, which limits the materials of which the screen may be made such that the screen design is not flexible. The high voltage of the electron-beam that must be utilized to create infrared images with portions having relatively high temperatures also produces hazardous X-rays, which requires that the electron-beam image projector be extensively shielded.

Thus, conventional infrared image projectors are capable of generating a desired image, but not generating the desired temperature associated with one or more portions of the image when the temperature is extremely hot and/or when a relatively hot portion of the image is located adjacent to a relatively cool portion of the image. For example, the plume of a missile may reach temperatures around 1000 Kelvin, but the atmosphere around the plume is not nearly that hot. Because conventional infrared image projectors are not capable of generating an image having one or more portions at 1000 Kelvin, expensive test may be required, such as actual missile launches or engine tests to accurately test missile defense systems, which is expensive and time consuming.

As such, there is a need for an infrared image generator that is capable of providing infrared images with one or more portions having extremely high temperatures, such as around 1000 Kelvin, that are adjacent to relatively cool portions of the image. In addition, there is a need for an infrared image generator that is easy and safe to make, use and adjust, if needed and that has a design that is flexible and not complicated. Such an infrared image generator should also cost less and be less time-consuming than the conventional infrared image generators.

BRIEF SUMMARY OF THE INVENTION

The present invention provides an infrared image generation device and method and a system for testing an infrared sensor that has a flexible design, is easy to manufacture and is capable of generating realistic images that have one or more relatively high-temperature portions adjacent to relatively cool-temperature portions. In addition, the infrared image generation device, method and system are capable of generating realistic dynamic infrared images. Thus, the device, method and system of the present invention greatly reduce the development costs and time associated with technologies that utilize infrared sensors because the sensors may be tested in a lab with the realistic infrared images that may be generated in accordance with the present invention, instead of requiring the sensors be tested in actual situations, which is currently common particularly to test infrared sensors in missile defense systems. In addition, the device, method and system of the present invention permit faster deployment of the technologies that utilize infrared sensors and the deployed sensors are more reliable because the testing of the sensors may be expedited and is more realistic by utilizing the present invention instead of the conventional approaches.

The infrared image generation device of the present invention includes a laser light source, at least one scanner, a processor and a target plate. The laser light source may be a pumped solid-state laser light source. The scanner(s) receive the laser light from the laser light source and can redirect the laser light. In addition, the scanner(s) may include an amplifier. The processor controls operation of the scanner(s) to generate at least one infrared image. For instance, in some embodiments of present invention, the processor may control output power of the laser light source. The target plate receives the redirected light from the scanner(s) and, as such, the infrared image(s) are generated on the target plate. For instance, the target plate may display an infrared image having at least one portion that is a temperature of at least 1000 Kelvin. A relay or output optical system, such as a collimator may also be disposed opposite the scanner(s) relative to the target plate.

The target plate may be made of a transparent heat sink layer facing the scanner(s), an insulator layer adjacent to the transparent heat sink layer, and an emissive layer that is at least opaque and is adjacent to the insulator layer. In certain embodiments, the transparent heat sink layer may be made of diamond, the insulator layer may be made of heat-resistant glass, and/or the emissive layer may include carbon.

In the method for generating an infrared image according to the present invention, laser light is provided, the laser light is scanned across a target plate, and at least one infrared image is generated on the target plate in response to the laser light scanned thereacross. To provide the laser light, a laser light source may be controlled to transmit the laser light at at least one power level. The method may also include drawing heat out of the target plate after scanning the laser light across the target plate to prevent the laser light from heating portions of the target plate other than the portion on which the laser light is incident. In addition, the generated image may be collimated for viewing by a sensor.

As described above, the infrared image that is generated may include at least one portion that represents a temperature of at least 1000 Kelvin. In one embodiment, to generate the infrared image(s), some laser light may be received at a first power level to generate at least one portion of the image having a first temperature and other laser light may also be received at a second power level to generate another portion of the image having a second temperature. In this situation, the second power level and second temperature are less than the first power level and first temperature, respectively. In another embodiment, to generate the infrared image(s), some laser light may be received for a first period of time to generate at least one portion of the image having a first temperature and other laser light may also be received for a second period of time to generate another portion of the image having a second temperature. In this situation, the second period of time and second temperature are less than the first period of time and first temperature, respectively.

Another aspect of the present invention also includes a system for testing an infrared sensor. The system includes a source element, at least one scanning element, a processing element, a target element and an infrared sensor element. The source element is capable of providing laser light and the scanning element(s) are capable of receiving the laser light and redirecting it. The system may also include a lens element that is capable of focusing the laser light that is incident upon the target element. The lens element may be located on either side of the scanning element(s). In some embodiments, the lens element may be part of the source element. The processing element is capable of controlling the operation of the scanning element(s) to generate at least one infrared image and determining whether the sensor element detects the infrared image(s). In other embodiments, a second processing element in communication with the sensor element may determine whether the sensor element detects the infrared image(s). The processing element may also be capable of controlling the output power of the source element. The target element is capable of receiving the redirected laser light from the scanning element(s) located on one side of the target element, while displaying the infrared image(s) on an opposite side of the target element. As such, the infrared sensor element faces the side of the target element on which the infrared image(s) are displayed. The target element may also be capable of displaying an image having one or more portions at a temperature of at least 1000 Kelvin. In addition, the target element may include a heat sink element that is capable of drawing heat out the target element to prevent the laser light from heating portions of the target element other than the portion on which the laser light is incident. Furthermore, some embodiments of the system for testing an infrared sensor of the present invention may include a relay or output optical element, such as a collimating element, that is capable of focusing the infrared image(s) at the focal point of the infrared sensor element.

Thus, the device, method and system of the present invention provide realistic infrared images that also reflect the actual temperatures of the object from which the image is made. In addition, the device, method and system of the present invention have a very flexible design such that the manufacture and any subsequent change in the device, method and system can be accomplished in a relatively short period of time as compared to conventional infrared image generators. As such, the present invention reduces development costs associated with infrared sensors, produces more reliable infrared sensors and, therefore, more reliable technologies that utilize infrared sensors, and permit faster deployment of infrared sensors.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
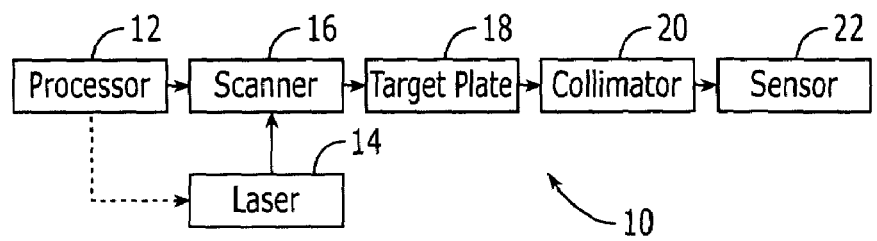
FIG. 1 is a block diagram representing the various components of an infrared image generation device and system for testing an infrared sensor according to one embodiment of the present invention.

As shown in FIG. 1, the infrared image generation device and system 10 for testing an infrared sensor according to the present invention includes a laser light source 14, at least one scanner 16, a processor 12 and a target plate 18. In certain embodiments of the device and system 10, a collimator 20 may also be included. The system also includes an infrared sensor 22 to be tested utilizing the image generation device.

The laser light source 14 may be any type of source capable of providing laser light that is known to those skilled in the art. For example, in one embodiment of the present invention, the laser light source is a diode pumped solid-state laser light source, such as the 58 GLS 309 laser light source commercially available from Melles Griot, Inc. The wavelength of the laser beam propagated by the laser light source may be any wavelength capable of creating the desired types of infrared images on the target plate 18. In general, a relatively shorter wavelength is capable of creating images with finer resolution on the target plate. In some embodiments, however, laser light in the infrared spectrum is not utilized to avoid infrared laser light from the laser light source leaking through the target plate and corrupting the generated image. For instance, in one embodiment of the present invention, the wavelength of the laser beam is 532 nanometers. In addition, in some embodiments of the present invention, the laser light source 14 may include a lens that focuses the laser light that is incident upon the target plate 18. The lens that focuses the laser light creates more concentrated laser power on the desired point of the target plate, which generates a higher temperature and provides high resolution. In other embodiments, however, the lens may be separate from the laser light source and may be located on either side of the scanner(s) 16.

The scanner(s) 16 receive the laser light from the laser light source 14 and redirect the laser light, such as onto the target plate 18. Typically two scanners are utilized, one scanner in the x-direction and one scanner in the y-direction, as known to those skilled in the art. However, a single scanner may be utilized if desired. The scanner(s) 16 may also include an amplifier to amplify the received laser light anytime before, after or while redirecting the laser light. For example, in one embodiment of the present invention, the scanners are provided in a Cambridge 6210 x-y scanner set with an amplifier, commercially available from Cambridge Technology, Inc.

The operation of the scanner(s) 16 is typically controlled by the processor 12. In addition, in one embodiment of the present invention, the processor 12 also controls the output power of the laser light source 14. For example, in one embodiment of the present invention, the processor 12 may be a personal computer including laser signal processing functionality. For instance, the personal computer may utilize an image processor, such as the LD2000 image processor utilizing the QM2000 interface, commercially available from Pangolin Laser Systems, Inc. In various embodiments of the present invention, the scanner(s) 16, laser light source 14 and processor 12 may be part of one piece of equipment, any two of the scanner(s) 16, laser light source 14 and processor 12 may be part of one piece of equipment, or each of the scanner (s) 16, laser light source 14 and processor 12 may be separate pieces of equipment and any communications between the separate pieces of equipment may occur in any manner known to those skilled in the art, such as via wires, cables or wireless technologies.

The target plate 18 receives the laser light that is redirected by the scanner(s) 16 and displays the generated infrared image(s). In general, the target plate 18 receives the laser light on a first side 23 and displays the infrared image(s) on a second side 25 that is opposite the first side 23. Thus, the first side 23 of the target plate 18 faces the scanner(s) 16. It is noted that in facing the scanner(s) 16, the first side 23 of the target plate 18 may physically face the scanner(s) or the first side of the target plate may optically, but not physically, face the scanner(s). In the latter instance, the redirected laser light emitted by the scanner(s) may be optically redirected prior to being incident upon the target plate 18. As such, the scanner (s) and the target plate may be positioned such that the first side 23 of the target plate does not physically face the scanner (s). The first side 23 of the target plate, however, will still be considered to face the scanner(s) since the laser light incident upon the target plate first impinges upon the first side 23.

Figure 2:
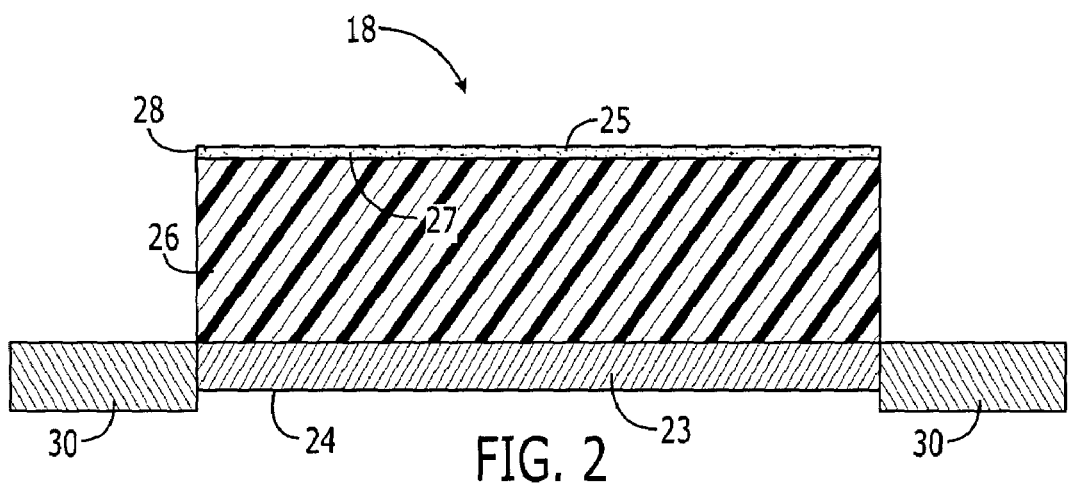
FIG. 2 is a perspective view of a target plate according to one embodiment of the present invention.

A detailed view of the various layers of one embodiment of a target plate 18 is shown in FIG. 2. FIG. 2 illustrates laser light 27 that is incident on the first side 23 of the target plate 18 and propagates through the target plate 18 to the second side 25 of the target plate 18. The first side 23 of the target plate 18 may be made of a layer of any type of transparent thermally conductive material known to those skilled in the art that is capable of withstanding the temperatures generated by the laser light that is incident upon the target plate 18. The layer of transparent conductive material also draws heat out of the target plate 18 to prevent the areas other than those on which the laser light is incident from being indirectly heated. Thus, the transparent conductive material allows a significant difference in temperature between two adjacent portions of the target plate 18, as described herein. In addition, the transparent conductive material is also capable of "erasing" an image generated on the target plate 18 by drawing the heat out of the target plate 18, which allows the drawing of dynamic images on the target plate. For example, in one embodiment of the present invention, the layer of transparent conductive material may be a transparent heat sink layer 24, such as a layer of diamond, commercially available from Harris International. In this embodiment, the transparent heat sink layer 24 may be 0.25 to 1 mm thick. In other embodiments, the transparent heat sink layer 26 may have other thicknesses depending upon the type of material used for the transparent heat sink layer and the thermal capacity that is required for the application 26.

In the embodiment of the target plate 18 shown in FIG. 2, the transparent heat sink layer 24 may be adjacent to an insulator layer 26. The transparent heat sink layer 24 may be attached to the insulator layer 26 in any manner known to those skilled in the art. For example, the transparent heat sink layer 24 may be attached to the insulator layer 26 with epoxy or any other type of adhesive that is capable of withstanding the temperatures generated by the laser light that is incident upon the target plate 18. The insulator layer 26 may be made of any thermally insulating material known to those skilled in the art that is capable of withstanding the temperatures generated by the laser light that is incident upon the target plate 18. In addition, the insulator layer 26 is transparent in advantageous embodiments. For example, in one embodiment of the present invention, the insulator layer 26 is made of heat-resistant glass, such as Pyrex® glass, commercially available from Corning Glass Works Corporation, or silica. In this embodiment, the insulator layer 26 may be 0.5 to 10 mm thick. In other embodiments, the insulator layer 26 may have other thicknesses depending upon the type of material used for the insulator layer 26. In addition, the insulator layer 26 may be partially, as opposed to totally, transparent in some embodiments, although reduction in the transparency may adversely affect the efficiency of the device.

The second side 25 of the target plate 18 may be an emissive layer 28 and may be adjacent to the insulator layer 26, as shown in FIG. 2. The emissive layer 28 is at least opaque, such that it may be black or almost black in both the visible and infrared spectrums, to provide a background on which to display the infrared image(s). The emissive layer 28 may be any at least opaque material known to those skilled in the art that is capable of withstanding the temperatures generated by the laser light that is incident upon the target plate 18 and that is capable of bonding to the insulator layer 26. In one embodiment of the present invention, the emissive layer 28 may include carbon. For example, the emissive layer 28 may be made of a layer of black paint that is applied to the outer side of the insulator layer 26, such as the high-temperature black paint commercially available from Aremco, Inc. In this embodiment, the emissive layer 28 may be 0.01 mm thick. In other embodiments, however, the emissive layer 26 may have other thicknesses depending upon the type of material used for the emissive layer 26. In another embodiment of the target plate 18, the emissive layer 28 may be made of an opaque ceramic material, such as that commercially available from Coorstek. Any manner known to those skilled in the art may be utilized to attach the emissive layer 28 to the insulator layer 26 when the emissive layer 28 is not directly applied to the surface of the insulator layer 26, such as the way in which paint may be directly applied to the surface of the insulator layer 26. For example, the emissive layer 28 may be attached to the insulator layer 26 with epoxy or any other type of adhesive that is capable of withstanding the temperatures generated by the laser light that is incident upon the target plate 18.

As shown in FIG. 2, a holder 30 may be utilized to hold the target plate 18 in position relative to the scanner and other elements of the device. In one embodiment of the present invention, the holder 30 may be any type of thermally conductive material known to those skilled in the art, such as copper and/or aluminum. Therefore the thermally conductive holder 30 is capable of receiving heat from the transparent heat sink layer 24 to cool the transparent heat sink layer 24. The thermally conductive holder 30 may be in thermal communication with a cooling device, such as a fan or other such device to cool the holder 30.

The device and system 10 of the present invention may also include an output or relay optical system, such as a collimator 20, as shown in FIG. 1. If an output or relay optical system, such as collimator 20, is utilized, it may be located between the target plate 18 and the infrared sensor 22. Thus, the output or relay optical system is capable of focusing the infrared image(s) displayed on the second side of the target plate 18 at the focal point of the infrared sensor 22. As such, in an embodiment in which the infrared sensor 22 is focused at infinity, the output or relay optical system, such as a collimator 20 focuses the infrared image(s) from the target plate 18 at infinity, such as by directing the image in a parallel fashion. The output or relay optical system therefore may be made of any material(s) that provide the desired focusing of the infrared image(s) from the target plate 18, such as an off-axis parabolic mirror or any other kind of relaying or optical system. In addition, the optical system may include a flat mirror to redirect the image toward the infrared sensor 22.

Thus, the device and system 10 of the present invention may be utilized to test any type of infrared sensor 22 to ensure the infrared sensor 22 accurately detects the desired type(s) of infrared image(s). For example, the infrared sensor 22 may be camera or other infrared sensing device known to those skilled in the art. In addition, the infrared sensor 22 may be utilized in night-vision technologies, may be utilized in missile defense systems, and/or any other type of technology utilizing infrared detection. The infrared sensor 22 therefore must be able to accurately detect one or more types of infrared images so that the technology that relies upon the infrared image detection functions properly. For example, in missile defense systems, an infrared sensor is utilized to detect missiles so that the missile defense system can neutralize the missile. The infrared sensors utilized in missile defense systems therefore must be tested to ensure that the infrared sensors will accurately detect missiles.

The device and system 10 of the present invention generates realistic infrared images that the infrared sensors under test would likely "see" in typical operation to test whether the infrared sensors accurately detect the infrared images. The device and system 10 are therefore capable of generating infrared images that have realistic temperatures for the various portions of the images. For example, in the case of an infrared image of a missile as generated by the device and system 10 of the present invention, the image may have one or more portions that have a temperature of at least 1000 Kelvin adjacent to one or more portions that have a temperature significantly less than 1000 Kelvin.

Figure 3:
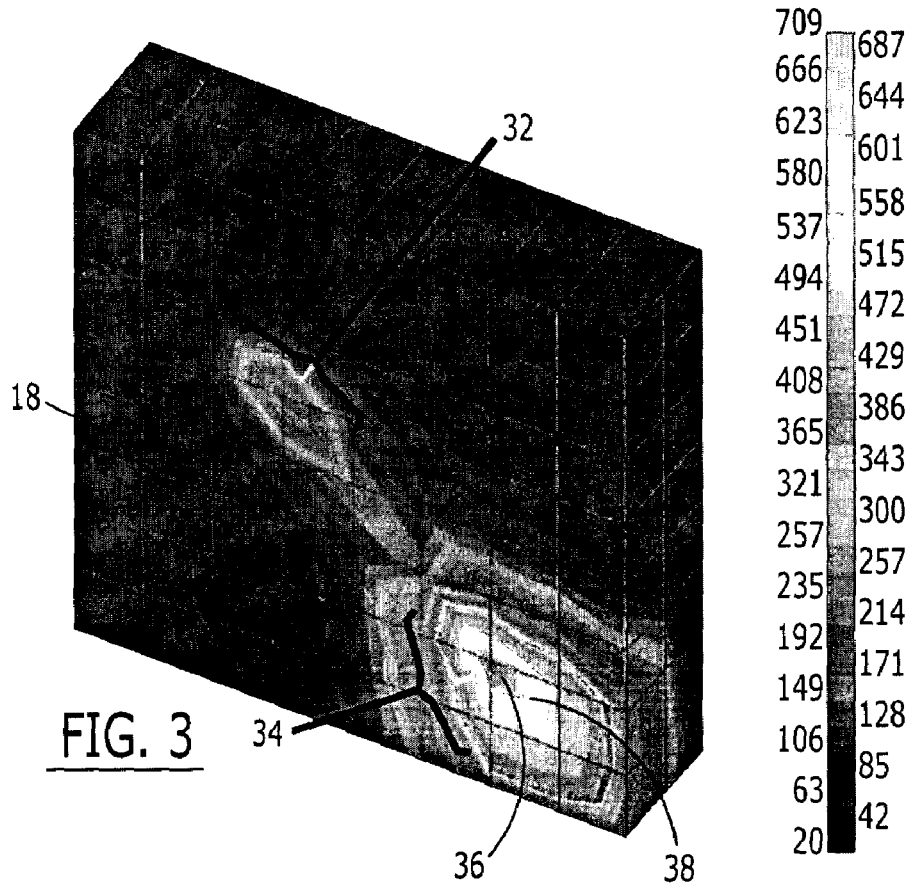
FIG. 3 is a diagram of an infrared image generated on a second side of the target plate in response to the laser light that is incident on the first side of the target, according to one embodiment of the present invention.

As such, in the embodiment of the infrared image of a missile 32 and plume 34 shown in FIG. 3, the plume has a first portion 36 that is approximately 1000 Kelvin (i.e., approximately 709° C.) and a second portion 38 that is adjacent to the first portion 36 that is approximately 800 Kelvin (i.e., approximately 537° C.).

The method for generating an infrared image according to the present invention therefore includes providing the laser light, such as from the laser light source 14, scanning the laser light across the target plate 18, such as by the scanner(s) 16, and generating the infrared image(s) on the target plate in response to the laser light that is scanned across the target plate 18.

The laser light is therefore controlled, such as by the processor 12 as described above, to scan the laser light across the target plate 18 in order to draw the images on the target plate 18 where the infrared images are displayed. Thus, the processor 12 may utilize any type of image modeling software known to those skilled in the art to provide the model(s) of the image(s) that are generated on the target plate 18. For example, in one embodiment of the present invention, the processor 12 may utilize thermal analysis software, such as that commercially available from Harvard Thermal, Inc. As such, the thermal analysis software may be utilized to model any type of desired image and the processor 12, such as via the laser signal processing functionality described above, may control the laser light source 14 and/or the scanner(s) 16 based upon the modeled image to generate the realistic infrared image on the target plate 18. For example, in application, a developer may create a desired thermal image utilizing the thermal analysis software, the thermal analysis software provides input to the processor 12 as to the temperature of the desired thermal image in the different regions of the image, and the processor may convert the temperatures to power appropriate power levels for the laser to create the image on the target plate 18. In other embodiments, a developer may utilize the thermal analysis software to obtain an estimate of the power levels needed for the laser to create the desired image on the target plate, then refine the power levels by experimentation. In addition, the image modeling software may be utilized to scale the desired image to ensure that the desired position of the generated image is on the target plate 18. Thus, the device, method and system of the present invention provide flexibility and time and cost savings in that various types of images may be generated on the same target plate, unlike the conventional image generation devices that require a separate device for each image that is generated.

Figure 4:
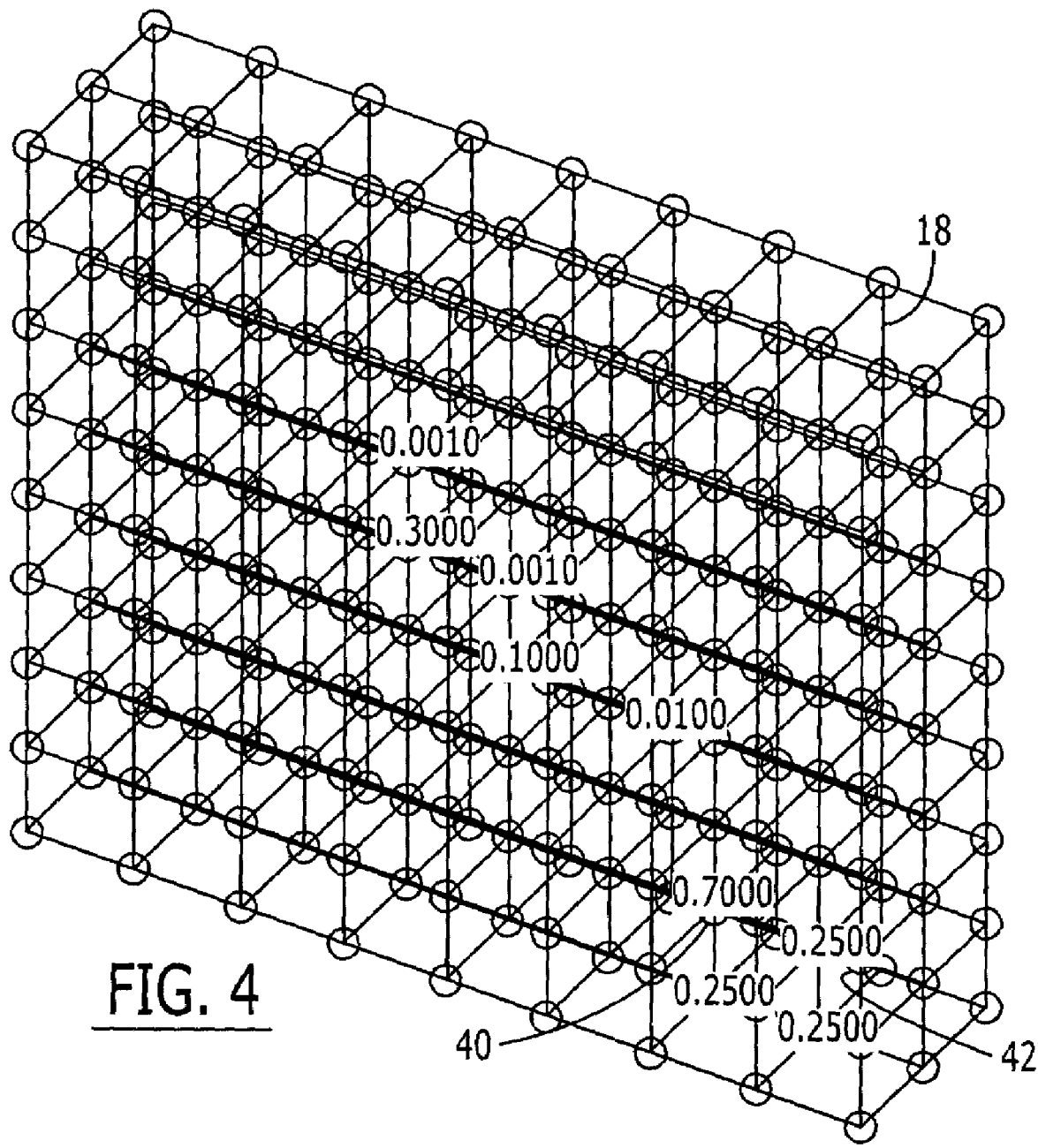
FIG. 4 is a diagram of the location and wattage of the laser light on a first side of the target plate according to one embodiment of the present invention.

One technique for generating the infrared image includes controlling the power level of the laser light that is incident upon the target plate 18. For example, the processor 12 may control the laser light source and/or scanners such that to produce portions of the infrared image having a higher temperature, the power of the laser light that is incident upon the target plate at those portions is higher than the power level of the laser light that is incident upon the target plate to produce portions of the infrared image having a lower temperature. Thus, as shown in FIG. 3, the power level of the laser light that is incident on the target plate 18 at first portion 36 is higher than the power level of the laser light that is incident on the target plate 18 at second portion 38. FIG. 4 illustrates the various power levels of the laser light incident upon the first side of the target plate 18 to produce the image of the missile 32 and plume 34 on the second side of the target plate 18 shown in FIG. 3. Thus, as shown in FIG. 4, 0.700 Watts of laser power is incident upon the first side of the target plate 18 at area 40 to generate the first portion 36 of the infrared image on the second side of the target plate 18 and 0.250 Watts of laser power is incident upon the first side of the target plate 18 at area 42 to generate the second portion 38 of the infrared image on the second side of the target plate 18. The power levels that are shown in FIG. 4 are inputted into the thermal analysis software described above and the software outputs the image model based upon the power levels and locations specified. If the image model is acceptable, then the inputted power levels may be utilized to produce the infrared image on the target plate and any further refinement of the image may be done by adjusting the power levels accordingly. In addition, any type of animation to provide a dynamic image, scaling of the image, or any other manipulation of the image may be completed via the processor 12, such as via the laser signal processing functionality described above.

The different power levels of the laser light may be produced in any manner known to those skilled in the art. For example, in one embodiment of the present invention, the different power levels of the laser light may be produced by directly controlling the power level of the laser light source, either by control of the laser and/or control of the amplifier of the scanner(s), prior to receipt of the laser light by the target plate 18 at the desired location. Alternatively, or additionally, the different power levels of the laser light may be produced by activating the laser light source for longer periods of time when the laser light is incident upon the area of the target plate where a hotter portion is desired and activating the laser light source for shorter periods of time when the laser light is incident upon the area of the target plate where a cooler portion is desired. In another embodiment, the different power levels of the laser light may be produced by drawing the portions of the image having a higher temperature more often than the portions of the image having a cooler temperature. As such, the laser power control of the scanner(s) 16 and the processor 12 can cycle at any rate that ensures the temperatures of the various portions of the generated infrared image(s) are consistent. For example, in one embodiment of the present invention, the scanner(s) 16 and the processor 12 may cycle at 100 Hz, while in another embodiment the scanner(s) 16 and the processor 12 may cycle at 2 Hz.

Thus, the device, method and system of the present invention provide realistic infrared images that also reflect the actual temperatures of the object from which the image is made. In addition, the device, method and system of the present invention have a very flexible design such that the manufacture and any subsequent change in the device, method and system can be accomplished in a relatively short period of time as compared to conventional infrared image generators. As such, the present invention reduces development costs associated with infrared sensors, produces more reliable infrared sensors and, therefore, more reliable technologies that utilize infrared sensors, and permit faster deployment of infrared sensors.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for generating an infrared image, comprising:
    providing laser light;
    scanning laser light across a first side of a target plate;
    displaying at least one infrared image on a second side of the target plate, opposite the first side, in response to the laser light scanned thereacross, wherein displaying the at least one infrared image comprising displaying at least one infrared thermal image having hotter and cooler portions at different respective temperatures;
    drawing heat out of the target plate after scanning the laser light across the target plate to prevent the laser light from heating portions of the target plate other than the portion on which the laser light is incident; and
    determining whether a sensor which faces the second side of the target plate detects the at least one infrared image.

2. The method for generating an infrared image of claim 1, wherein generating at least one infrared image comprises generating at least one infrared image having at least one portion that is a temperature of at least 1000 Kelvin.

3. The method for generating an infrared image of claim 1, further comprising collimating the at least one generated image for viewing by the sensor.

4. The method for generating an infrared image of claim 1, wherein providing the laser light comprises controlling a laser light source to transmit the laser light at at least one power level.

5. A method for generating an infrared image comprising:
    providing laser light;
    scanning laser light across a first side of a target plate;
    displaying at least one infrared image on a second side of the target plate, opposite the first side, in response to the laser light scanned thereacross, wherein displaying the at least one infrared image comprising displaying at least one infrared thermal image having hotter and cooler portions at different respective temperatures; and
    determining whether a sensor which faces the second side of the target plate detects the at least one infrared image, wherein generating the at least one image comprises receiving the laser light having a first power level to generate at least one portion of the image having a first temperature and receiving the laser light having a second power level to generate at least one portion of the image having a second temperature, wherein the second power level and second temperature are less than the first power level and first temperature, respectively.

6. A method for generating an infrared image comprising:

providing laser light;

scanning laser light across a first side of a target plate;

displaying at least one infrared image on a second side of the target plate, opposite the first side, in response to the laser light scanned thereacross, wherein displaying the at least one infrared image comprising displaying at least one infrared thermal image having hotter and cooler portions at different respective temperatures; and determining whether a sensor which faces the second side of the target plate detects the at least one infrared image, wherein generating the at least one image comprises receiving the laser light for a first period of time to generate at least one portion of the image having a first temperature and receiving the laser light for a second period of time to generate at least one portion of the image having a second temperature, wherein the second period of time and second temperature are less than the first period of time and first temperature, respectively.

7. A system for testing an infrared sensor, comprising:

a source element configured to provide laser light;

at least one scanning element configured to receive the laser light from said source element and further configured to redirect the laser light;

a processing element configured to control operation of said at least one scanning element to generate at least one infrared image;

a target element configured to receive the redirected laser light from said at least one scanning element on a first side of said target element and further configured to display at least one infrared image on a second side of said target element that is opposite the first side, wherein said target element comprises a heat sink element configured to draw heat out of said target element to prevent the laser light from heating portions of said target element other than the portion on which the laser light is incident; and an infrared sensor element facing the second side of said target element, wherein said processing element is also configured to determine whether said sensor element detects the at least one infrared image.

8. The system of claim 7, wherein said source element is a diode pumped solid-state laser light source.

9. The system of claim 7, wherein said at least one scanning element comprises an amplifier.

10. The system of claim 7, wherein said target element comprises:

a transparent heat sink layer facing said at least one scanning element;

an insulator layer adjacent the transparent heat sink layer; and an emissive layer that is at least opaque adjacent the insulator layer.

11. The system of claim 10, wherein the transparent heat sink layer is made of diamond.

12. The system of claim 10, wherein the insulator layer is made of heat-resistant glass.

13. The system of claim 10, wherein the emissive layer comprises carbon.

14. The system of claim 7, further comprising a collimator disposed opposite said at least one scanning element relative to said target target element.

15. The system for testing an infrared sensor of claim 7, wherein said processing element is configured to control output power of said source element.

16. The system for testing an infrared sensor of claim 7, further comprising a relay optical element configured to focus the at least one infrared image at a focal point of said infrared sensor element.

17. The system for testing an infrared sensor of claim 7, wherein said target element is configured to display an image having at least one portion that is a temperature of at least 1000 Kelvin.

* * * * *